United States Patent
Mignard et al.

(12) 
(10) Patent No.: US 6,329,314 B1
(45) Date of Patent: Dec. 11, 2001

(54) PROCESS FOR ACTIVATION OF A CATALYST IN THE PRESENCE OF THIONIC AND NITROGENOUS COMPOUNDS

(75) Inventors: Samuel Mignard, Chatou; Virginie Harle, Lamorlaye; Slavik Kasztelan, Rueil Malmaison; Nathalie Marchal-George, Saint Genis Laval, all of (FR)

(73) Assignee: Institu Francais du Petrole (FR)

( * ) Notice: Subject to any disclaimer, the term of this patent is extended or adjusted under 35 U.S.C. 154(b) by 0 days.

(21) Appl. No.: 09/305,287

(22) Filed: May 5, 1999

(30) Foreign Application Priority Data

May 6, 1998 (FR) .................................................. 98 05741

(51) Int. Cl.⁷ .......................... B01J 27/049; B01J 27/043
(52) U.S. Cl. .......................... 502/222; 502/200; 502/219; 502/221; 502/306; 502/325; 502/337
(58) Field of Search ................................... 502/200, 201, 502/216, 219, 220, 221, 222, 306, 325, 337

(56) References Cited

U.S. PATENT DOCUMENTS 4,719,195 * 1/1988 Toulhoat et al. ..................... 502/216
4,725,569 * 2/1988 Tuszynski et al. .................. 502/168
4,725,571 * 2/1988 Tuszynski ............................ 502/220

FOREIGN PATENT DOCUMENTS

| 0 064 429 | 11/1982 | (EP) . |
| 0 335 754 | 10/1989 | (EP) . |
| 0 409 680 | 1/1991 | (EP) . |
| 2 668 951 | 5/1992 | (FR) . |

OTHER PUBLICATIONS

Translated abstract of FR 2 668 951*

* cited by examiner

Primary Examiner—Steven P. Griffin
Assistant Examiner—Christina Ildebrando
(74) Attorney, Agent, or Firm—Millen, White, Zelano & Branigan, P.C.

(57) ABSTRACT

A process for activation of a hydroconversion catalyst, whereby said catalyst contains at least one metal or element of group VIII, at least one acid element and optionally at least one metal or element of group VI according to which a light petroleum fraction, at least one thionic compound and at least one nitrogenous compound are injected in said catalyst. This process is carried out such that the QS sulfur amount that is injected before the temperature of the catalyst reaches 250° C. is at least equal to half the $QS_O$ sulfur amount that is necessary for complete sulfurization of the catalyst.

9 Claims, No Drawings

PROCESS FOR ACTIVATION OF A CATALYST IN THE PRESENCE OF THIONIC AND NITROGENOUS COMPOUNDS

This invention relates to a process for activation of a catalyst that is used in particular in the hydroconversion stage in hydrocracking units of petroleum feedstocks, the catalyst that is obtained by this process and its use in hydroconversion.

The hydrocracking process of heavy petroleum fractions is a very important refining process that makes it possible to produce lighter fractions such as gasolines, jet fuels and light gas oils from excess heavy feedstocks that cannot be readily upgraded. Such feedstocks are sought by refiners to adapt their production to the demand.

Relative to the catalytic cracking process, the advantage of the catalytic hydrocracking process is to provide middle distillates, jet fuels and gas oils of very good quality. By contrast, the gasoline that is produced has a lower octane number than that that is obtained from catalytic cracking.

The hydrocracking process thus exhibits great flexibility at various levels: flexibility at the level of the catalysts that are used, which generates a flexibility of the feedstocks that are to be treated and thus makes it possible to obtain a variety of products.

The different stages of the hydrocracking process are carried out in the presence of hydrogen. This process makes possible the conversion of middle or heavy distillates and optionally residues that are deasphalted (atmospheric or vacuum) into gasolines, jet fuels and gas oils, whereby the selection of the conversion is determined based on geographic and seasonal needs of the markets. The hydrocracking process can also be used for obtaining light hydrocarbons (propane and butanes) or oil bases for engines with enhanced viscosimetric qualities. Relative to the catalytic cracking process, the hydrocracking process makes it possible to convert heavy fractions into light products that are more readily upgraded but under very different conditions. The hydrocracking process is carried out at relatively low temperatures (350° C. to 450° C.) and under a high hydrogen partial pressure (2.5 to 30 MPa). According to the nature of the feedstocks that are to be treated, desired products and performance levels of catalysts, several process diagrams (flow sheets) have been designed.

The process diagrams can be divided into two categories: the so-called "one stage" or else "without intermediate separation" or else "series flow" process diagram and the so-called "two stage" or else "with intermediate separation" process diagram.

In the "one stage" process, the feedstock is previously hydrotreated on a catalyst to carry out reactions of hydrodesulfurization, hydrodenitrating, hydrogenation of aromatic compounds as well as optionally hydroconversion. The effluents of this stage including gases are then admitted on a second (or several) catalyst that is much more acidic and that more particularly carries out hydroconversion reactions.

In the "two stage" process, an intermediate separation is initiated between the hydrotreatment stage and the hydroconversion stage, whose purpose is to eliminate the hydrogen sulfide ($H_2S$) and ammonia ($NH_3$) to "protect" the hydroconversion catalyst from deleterious partial pressures of $H_2S$ and $NH_3$. The advantages of one or the other of the diagrams depends strongly on the required flexibility and the characteristics of the feedstock.

Regardless of the type of process, two sections are always distinguished:

a high-pressure section that comprises one or more furnaces that are intended to heat the feedstock and the hydrogen, one or more reactors, one or more heat exchangers, a condenser, a gas-liquid separator, a recycling compressor and one or more make-up compressors;

a low-pressure section that ensures the stabilization and the fractionation of reaction products.

The petroleum fractions that are to be treated are heavy fractions such as vacuum distillates, deasphalted or hydrotreated residues. These heavy fractions preferably consist of at least 80% by volume of compounds whose boiling points are greater than 350° C. and preferably between 350° C. and 580° C. (i.e., they correspond to compounds that contain 15 to 40 carbon atoms). These heavy fractions also generally contain heteroatoms, such as sulfur and nitrogen. Relative to the weight of the feedstock, the nitrogen content is generally between 1 and 5000 ppm by weight, the sulfur content is generally between 0.01 and 5% by weight, and the total content of metals, which are typically vanadium, nickel, and arsenic, is less than 200 ppm. The conditions of the hydroconversion reaction such as temperature, pressure, hydrogen recycling rate, and hourly volumetric flow rate are very variable based on the nature of the feedstock, the quality of the desired products, and installations that the refiner uses.

A hydrocracking unit often uses several types of catalysts. Generally, the catalysts that are located at the top are optimized to carry out the reactions of the hydrotreatment stage. The—first stage—hydrotreatment catalyst(s) comprises a matrix that contains at least one metal that has a hydro-dehydrogenating function, preferably this matrix contains alumina, and preferably this matrix does not contain zeolite. Said matrix can also contain silica, silica-alumina, boron oxide, magnesia, zirconia, titanium oxide or a combination of these oxides. The hydro-dehydrogenating function of this matrix is ensured by at least one metal or metal compound of group VIII of the periodic table (Handbook of Chemistry and Physics, 76th Edition, 1995–1996) such as in particular nickel and cobalt. The hydro-dehydrogenating function of this matrix can also be ensured by a combination of at least one metal or metal compound of group VI of the periodic table, in particular molybdenum and tungsten, and at least one metal or metal compound of group VIII, in particular cobalt and nickel. The total concentration of oxides of metals of groups VI and VIII is between 5 and 40% by weight and preferably between 7 and 30% by weight relative to the weight of the finished catalyst, whereby the ratio by weight that is expressed in terms of metal (or metals) of group VI to metal (or metals) of group VIII is between 1.25 and 20 and preferably between 1.5 and 10.

The expressions "element of the group" and "metal of the group" will be used equally in this description.

In addition, this catalyst can contain phosphorus, and the phosphorus content, expressed in diphosphorus pentoxide $P_2O_5$ concentration in the finished catalyst, is generally at most 15%, preferably between 0.1 and 15% by weight and still more preferably between 0.15 and 10% by weight relative to the catalyst.

The catalysts that are used in the hydroconversion stage are all of the bifunctional type that combine an element that contains an acid function with an element that contains a hydrogenating function. The acid function is provided by large surface substrates (150 to 800 $m^2 \cdot g^{-1}$ generally) that exhibit surface acidity. The acid substrates that are generally selected are halogenated aluminas (chlorinated or fluorinated in particular), combinations of boron and aluminum oxides, amorphous silica-aluminas and zeolites. The hydrogenating function is provided either by one or more metals of group VIII of the periodic table, such as iron, cobalt, nickel, ruthenium, rhodium, palladium, osmium, iridium and platinum, or by a combination of at least one metal of group VI of the periodic table, such as chromium, molybdenum and tungsten and at least one metal of group VIII.

The balance between the acid and hydrogenating functions is the basic parameter that governs the activity and the selectivity of the catalyst. A weak acid function and a strong hydrogenating function provide low-activity catalysts that work at a generally high temperature (greater than or equal to 390° C.), and at a low feed volumetric flow rate (the VVH that is expressed by volume of the feedstock that is to be treated per unit of volume of catalyst and per hour is generally less than or equal to 2) but are endowed with very good selectivity in middle distillates. Conversely, a strong acid function and a weak hydrogenating function provide very active catalysts for the hydroconversion reactions but exhibit poor selectivity of middle distillates. The problem that is posed to the user is therefore to choose judiciously each of the functions to adjust the activity/selectivity pair of the catalyst according to the feedstocks that are to be treated and the products that he wishes to obtain.

The stable and activated form of the catalysts that are used in the hydroconversion stage is the sulfurized form; these catalysts should therefore undergo a sulfurization stage before being used in hydroconversion. The sulfurization can be carried out in the unit itself or previously in the loading into the unit with specialized equipment. This sulfurization stage can be carried out by using any molecule that contains sulfur and can result in the formation of hydrogen sulfide; the hydrogen sulfide is actually the sulfurization agent of these catalysts.

It has now been discovered that, surprisingly enough, the activity and the stability of the catalysts that are used in the hydroconversion stage comprise at least one metal of group VIII and optionally at least one metal of group VI and in particular those of type NiMo, CoMo, NiW and CoW depend closely on the sulfurization procedure that is used to carry out this sulfurization.

The application of the sulfurization procedures of the hydrotreatment catalysts in liquid phase that are well known to one skilled in the art is not possible in the case of the hydroconversion catalysts.

The liquid phase sulfurization procedure actually makes it necessary to bring into contact a light petroleum fraction (kerosene, mineral spirit or preferably a gas oil) at final temperatures of at least 300° C. and even 350° C. This heat level is necessary to ensure a good transformation of oxides into sulfides. The hydroconversion reactors, however, often comprise at least one type of catalyst that contains a strong acid function that is provided by, for example, a zeolite. Starting at temperatures of 250° C. to 300° C., this catalyst therefore runs the risk of producing a cracking of the hydrocarbon fraction. This reaction, which is not controlled, can cause serious problems. On the one hand, there exists the danger that the catalyst may be damaged and prematurely deactivated by coking because it will have worked while it was not completely sulfurized, i.e., its hydrogenating function is still not operational. On the other hand, as far as the process is concerned, the phenomenon is dangerous because the exothermal cracking reaction can self-accelerate and result in thermal excursions (a so-called "run-away" phenomenon) that would damage the catalyst and then the reactors and could even cause the unit to explode.

The applicant was able to note, surprisingly enough, that better activity and a better stability of the catalyst for the hydroconversion were obtained if sulfurization were conducted by injecting a well-defined amount of sulfur before the temperature of the catalyst reaches 250° C. and by injecting a nitrogenous compound at a temperature that is less than 270° C. and preferably less than 230° C.

In the prior art, French Patent FR 2668951 describes a process for carrying out liquid phase sulfurization. According to this process, the sulfur and the nitrogen are introduced "in situ" in the zone where the hydrocracking will be carried out. No measurement of the sulfur amount that should be set in the catalyst before the temperature of this catalyst reaches 250° C. is specified, however.

This invention relates to a process for activation of a hydroconversion catalyst that contains at least one metal of group VIII, at least one acid element and optionally at least one metal of group VI. According to said process, a light petroleum fraction including at least 95% of the feedstock is distilled at a temperature that is less than 400° C., and this fraction can be, for example, a kerosene- or gas-oil-type fraction; at least one thionic compound and at least one nitrogenous compound are injected in the catalyst. According to the process of this invention, the QS sulfur amount that is injected before the temperature of the catalyst reaches 250° C. is at least equal to half the $QS_0$ sulfur amount that is necessary for complete sulfurization of the catalyst, i.e., a $QS/QS_0$ ratio that is at least equal to 0.5.

This invention also relates to the catalyst that is obtained by the activation process according to this invention.

Relative to the catalyst that is obtained by the dry phase process, the catalyst that is obtained by the activation process according to this invention exhibits better activity and better stability. Without wanting to be tied to any particular theory, it is possible to think that the control of the activity of the acid sites of the catalyst that is obtained by carrying out a passivation of a portion of these sites prevents a mis-timed cracking of the feedstock that is to be treated in these sites.

According to a preferred mode of the process of this invention, the sulfur and the nitrogen that are necessary for the activation of the catalyst are introduced in-situ in the zone where the feedstock that is to be treated will then be subjected to a reaction that is conducted in the presence of said catalyst. Thus, at least one nitrogenous compound and at least one thionic compound are added to the petroleum fraction.

According to the process of this invention, the nitrogenous compound is injected into the reactor at a temperature that is lower than 270° C. and preferably lower than 230° C., in an amount that is adequate for preventing the cracking of said catalyst. Of course, the temperature that is to be taken into consideration is the temperature of the catalyst when this catalyst is subjected to the passage of the nitrogenous compound and not a temperature that would be measured at any particular moment anywhere in the unit.

With regard to the thionic compound, the injected amount should be well defined and should be injected at a temperature that is lower than about 250° C. to ensure the triggering of the reaction. Of course, the temperature that is to be taken into consideration is the temperature of the catalyst when this catalyst is subjected to the passage of the sulfur or a compound that contains sulfur and not a temperature that would be measured at any particular moment, anywhere in the unit.

We have discovered, surprisingly enough, that the $QS/QS_0$ value that was reached for a temperature of the catalyst that is lower than 250° C. was very high. The notation $QS/QS_0$, used in this description, represents the amount of sulfur that is injected in the catalyst relative to the amount of sulfur that would be necessary for complete sulfurization of the catalyst, as defined above. For example, if $QS/QS_0=1$, this means that the amount of sulfur that is injected is equal to the amount of sulfur that is necessary for the sulfurization of the catalyst. $QS_0$ can also be defined as the stoichiometric amount of theoretical sulfur of the catalyst. Actually, it is possible to think that if a minimal $QS/QS_0$ value is not met, there exists the danger that the sulfurization of the catalyst may be inadequate and by the same token, there exists the danger that the catalytic performance levels that are expressed in terms of activity and stability may deteriorate.

During the activation stage, the catalyst in which the metals are in the oxide state sulfurizes. The set amount of sulfur varies from one catalyst to the next according to its process of production and the content of oxide(s) that is (are) deposited on the substrate. It is possible, starting from the composition of the catalyst, to calculate the amount of sulfur that, at the most, will be set on the catalyst. The amount of stoichiometric sulfur, denoted $QS_0$, will therefore be, by definition, the amount of sulfur that is necessary for the complete sulfurization of metal or mixtures of metals that enter the composition of the catalyst. These metals can be, for example, molybdenum, cobalt, nickel and tungsten which, after sulfurization, come respectively in the form of molybdenum disulfide $MoS_2$, nanocobalt octosulfide $Co_9S_8$, nickel sulfide $NiS$ and tungsten disulfide $WS_2$. The amount of stoichiometric sulfur can be expressed by any suitable units and most often, it is expressed either in sulfur moles per unit of mass of catalyst (for example in kilomoles of sulfur per ton of catalyst) or in unit of mass of sulfur per unit of mass of catalyst (for example in tons of sulfur per ton of catalyst).

It will be noted that for some catalysts and based on their uses, it is not always necessary to reach complete sulfurization of the active metal oxides of the catalyst, i.e., it is not necessary to reach $QS_0$ and that sometimes, it will be possible to stop precisely at a value on the order of 0.5 times $QS_0$.

Within the meaning of this description, "activity" is defined as the performance level of the catalyst during the first hours of its operation in the presence of the feedstock that is to be treated under the operating conditions of the installation. Within the meaning of this description, "stability" is defined as the changes in the activity of the catalyst over time; more specifically, the cycle duration of said catalyst between two regenerations will be taken into consideration. Within the meaning of this description, "feedstock that is to be treated" refers to the hydrocarbon fraction that is sent into the catalytic reactor to be transformed there.

The process according to this invention uses a very specific sulfurization feedstock. Most of the sulfurization now is carried out in liquid phase, i.e., the catalyst, when the sulfurization reaction has taken place, is immersed in a liquid phase. This liquid phase generally contains a hydrocarbon such as, for example, a mineral spirit or a gas oil. This liquid phase will preferably be free of diolefins and olefins, and consequently the bromine index of this phase, measured according to ASTM Standard Reference D 1159, is less than 5 and preferably less than 2. One of the main advantages in using a liquid phase is that the increase in temperature due to the exothermicity of the sulfurization reaction remains very small because the calories that are produced are easily dispersed in said liquid phase. The gaseous sulfurization feedstocks are not excluded, however.

The liquid sulfurization phase should contain at least one compound that generates $H_2S$ under the conditions of the sulfurization stage, i.e., a precursor of $H_2S$, for example dimethyl disulfide (DMDS) but may also contain pure $H_2S$ or $H_2S$ that is mixed with an $H_2S$ precursor. The $H_2S$ precursors that can be used, if their dissolution in the sulfurization liquid is complete, are polysulfides and, for example, the organic polysulfides that are called TPS, mercaptans, sulfides and disulfides, the oxidized compounds of sulfur, elementary sulfur that is dissolved and/or partially in suspension.

The organic polysulfides that are called TPS are described in, for example, FR Patent 2548205.

This liquid sulfurization phase should also contain at least one nitrogenous compound. This nitrogenous compound is selected from among the group of soluble compounds in the hydrocarbons. It is possible to cite primary, secondary and tertiary amines, compounds that contain a quaternary ammonium, arylamines such as the compounds of the family of aniline, pyrroles and its derivatives, pyridines, nitrites, ureas and thioureas, and nitrated, nitrous or nitrozated derivatives. More generally, it is possible to use any compound that contains hydrocarbon and nitrogen and in particular ammonia. It will also be possible to inject this compound in gas form in the circuit of the hydrogen. This gas can be, for example, ammonia.

The flow rate of the sulfurization feedstock that is introduced into the reactor is calculated relative to the catalyst volume that is loaded into the reactor where the sulfurization reaction took place. In the case of liquids, the liquid flow rate that is expressed by volume per hour is usually between 0.10 and 50 times the catalyst volume, preferably between 0.25 and 10, most often it is between 0.25 and 2 times the catalyst volume.

When the sulfurization feedstock that is used is gaseous, the gas flow rate that is expressed by volume per hour is much higher. The most ordinary value is between 1 and 10,000 liters of gas per liter of catalyst, measured under the normal conditions of temperature and pressure, and preferably between 10 and 5,000 liters of gas per liter of catalyst.

This invention also relates to the use of the catalyst according to this invention in a hydroconversion stage of a hydrocracking process. The catalysts are used to carry out hydroconversion reactions in the following operating conditions: a temperature of between 350° C. and 450° C., a pressure of between 2.5 MPa and 30 MPa and an hourly volumetric flow rate (VVH) of between 0.1 and 5 $h^{-1}$.

More generally, the implementation of a hydrocracking process can be carried out according to the following procedure: after loading into the reactor or reactors of the hydrocracking unit of the catalyst or different types of catalysts of which at least one is a hydroconversion catalyst, the unit is purged by nitrogen and then by hydrogen, and it is then pressurized to the nominal pressure of the unit or optionally an intermediate pressure that is generally between 0.3 and 30 MPa and more generally between 1 and 20 MPa. A quick depressurization test can be carried out at this stage. The catalytic beds are then heated under hydrogen to a temperature that is less than 240° C. and preferably less than 180° C. The sulfurization feedstock is then injected. The temperature zone that is preferred for the injection is 80° C. to 180° C. The increase of the temperature between the starting temperature and about 250° C. is carried out by the means that are known to one skilled in the art at a rate that is compatible with good mechanical behavior and the elimination of stresses that are produced by the expansion of different portions of the installation. By way of indication, the rise in temperature is generally on the order of 5 to 25° C. per hour but can also be carried out in stages.

The injections of sulfur and nitrogen can be controlled by dosages at the outlet of the reactor.

The hydrogen sulfide content can thus be measured in the gas at the outlet of the reactor, and it can be ensured that it is greater than 0.1% by volume before bringing the temperature of the catalytic beds beyond 200° C., and then it will be expected that this value will reach 0.5% by volume before the temperature of the catalytic beds is brought beyond 250° C. The amount of sulfur that is injected before the temperature of the catalytic beds reaches 250° C. should be such that $QS/QS_0$ is at least equal to 0.5.

The dissolved ammonia content in the wash water of the effluents at the outlet of the reactor is measured; it is verified that this content that is calculated relative to the effluent is greater than 0.1% by weight and preferably greater than 0.5% by weight before bringing the temperature of the catalytic beds of the hydroconversion catalyst beyond 230° C. Beyond this temperature, a periodic measurement of the presence of ammonia in the wash water makes it possible to verify that the catalytic beds are thoroughly flushed by the nitrogenous compound.

The activation procedure is then continued by increasing the temperature gradually at a rate of 1 to 100° C. per hour and preferably from 2 to 50° C. per hour, and this rise in temperature can be carried out either directly until the final temperature plateau or by observing intermediate plateaus. It has already been seen that keeping a final sulfurization temperature less than 380° C. makes it possible to avoid cracking the feedstock; a temperature of the final plateau of between 230 and 380° C. will therefore be preferred. In some cases, however, it is possible to choose to bring the temperature of the final plateau up to 400° C. and even up to 450° C. The duration of the rise in temperature is generally several hours.

The activation of the catalysts according to the method of the invention is reflected by an enhancement of the performance levels of the hydroconversion catalyst. Enhancing performance levels is defined as enhancing the activity and/or the stability of the catalyst.

The following examples illustrate this invention without limiting its scope.

EXAMPLES

The catalytic test unit of the following examples comprises two fixed-bed reactors with upward circulation of the feedstock ("up-flow"). 40·10₃l of catalyst is introduced into each of the reactors.

In the first reactor, the catalyst of first hydrotreatment stage HR360 that is marketed by the Procatalyse Company is introduced; this catalyst comprises an element of group VI and an element of group VIII that are deposited on alumina. In the second reactor, the catalyst of the second stage, i.e., the hydroconversion catalyst, is introduced.

The hydroconversion catalyst is produced in the following way: 20% by weight of a zeolite Y with a crystalline parameter that is equal to 24.46 Å (1 Å corresponds to $10^{-10}$ m) is used that is mixed with 80% by weight of SB3-type alumina that is marketed by the Condéa Company. The milled paste is then extruded through a die with a diameter that is equal to 1.4 mm. The extrudates are dried for one night at 120° C. under air and then calcined at 550° C. under air. The extrudates are impregnated in the dry state by a solution of a mixture of ammonium heptamolybdate —$Mo_7O_{24}$ $(NH_4)_6 \cdot 4H_2O$—, nickel nitrate —$Ni(NO_3)_2$— and orthophosphoric acid —$H_3PO_4$—, dried for one night at 120° C. under air and finally calcined under air at 550° C. The contents by weight of active oxides are as follows (relative to the catalyst): 2.6% by weight of nickel oxide NiO, 12.7% by weight of molybdenum oxide $MoO_3$, 5.5% by weight of phosphorus oxide $P_2O_5$.

The two catalysts undergo an in-situ sulfurization stage before reaction; the sulfurization procedures are described in Examples 1 and 2.

The sulfurization feedstock is an atmospheric gas oil that therefore does not contain olefinic compounds and to which dimethyl disulfide (DMDS) has been added. DMDS has been selected because it decomposes very easily in the presence of hydrogen to provide $H_2S$ and $CH_4$. Hydrogen sulfide ($H_2S$) that is thus formed will be able to carry out the sulfurization of the catalyst.

The characteristics of the atmospheric gas oil that is used as a sulfurization feedstock are recorded in Table 1.

TABLE 1

| | |
|---|---|
| Density at 15° C. | 0.856 |
| Refraction index at 20° C. | 1.4564 |
| Viscosity at 50° C. (cSt) | 3.72 |
| Sulfur content (% by weight) | 1.57 |
| Simulated distillation ASTM-D2887 method | |
| Starting point (0° C.) | 153 |
| 5% (° C.) | 222 |
| 50% (° C.) | 315 |
| 95% (° C.) | 398 |
| Final point (° C.) | 448 |

The operating conditions of the sulfurization stage are explained in Table 2.

TABLE 2

| | |
|---|---|
| Total pressure (MPa) | 9 |
| VVH ($h^{-1}$) | 2 |
| $H_2$ flow rate (l/l) | 1000 (reactor inlet) |

Once the sulfurization stage has ended, the temperature is dropped again to 150° C., and the injection of the feedstock that is to be treated can be carried out.

The hydroconversion stage using a catalyst whose preparation is described above is carried out following a hydrotreatment stage under hydrocracking conditions on a petroleum feedstock. The main characteristics of this petroleum feedstock are recorded in Table 3.

TABLE 3

| | |
|---|---|
| Starting point | 277° C. |
| 10% point | 381° C. |
| 50% point | 482° C. |
| 90% point | 531° C. |
| Final point | 545° C. |
| Pour point | +39° C. |
| Density (20/4) | 0.919 |
| Sulfur (% by weight) | 2.46 |
| Nitrogen (ppm by weight) | 930 |

The operating conditions in the hydrocracking unit, i.e., the operating conditions of the hydrotreatment and hydroconversion stages are a total pressure of 9 MPa, a hydrogen flow rate of 1000 normal liters of gaseous hydrogen per liter of injected feedstock, an overall hourly volumetric flow rate is 0.5 $h^{-1}$ or an hourly volumetric flow rate of 1.0 $h^{-1}$ for each catalyst.

The catalytic performance levels are expressed by the temperature that makes it possible to reach a gross conversion level of 70%. These catalytic performance levels are measured in the catalyst after a period of stabilization, generally at least 48 hours, has been observed. Gross conversion CB that is assumed equals the percentage by weight of the compounds with a boiling point that is less than 380° C. in the total weight of the compounds (with a boiling point that is less than or greater than 380° C.).

$$CB = \frac{\% \text{ by weight of } 380_{\mathit{eff}}^{-1}}{\% \text{ by weight of } 380_{\mathit{eff}} + \% \text{ by weight of } 380_{\mathit{eff}}}$$

Example 1
(According to the Invention)

The temperature of the two catalysts is raised from ambient temperature (20° C.) to 150° C. under pure hydrogen. Then, the sulfurization feedstock that is treated with DMDS alone (2.0% by weight) is injected at a flow rate of 160 cm$^3$/h. When the "high" level in the high-pressure separator is reached (the catalyst is then "wet"), the temperature of the catalyst is then increased to 230° C. at the rate of 10° C./minute, and then there is a plateau until the amount of sulfur that is provided by DMDS corresponds to a $QS/QS_0$ value that is equal to 0.6. The rise in temperature in this pilot-scale example is carried out at a much faster speed than for the embodiments on the industrial scale.

The preceding sulfurization feedstock is then replaced by a second sulfurization feedstock that is treated with DMDS (2% by weight) and aniline (0.55% by weight). The temperature is then increased to 350° C. at the rate of 10° C./minute, and there is a plateau until the amount of sulfur that is provided by DMDS corresponds to a $QS/QS_0$ value that is equal to 1.2. During this entire sulfurization phase, the amount of gas oil that is recovered is close to 98% of that of the injected gas oil, which indicates that the sulfurization feedstock is not subjected to any significant cracking reaction.

The temperature is then increased to the first test temperature, i.e., to 380° C., at which time sulfurization feedstock is replaced by the feedstock that is to be treated, i.e., by the feedstock that is to be hydrocracked that is described in Table 3.

Example 2
(Anomalous)

The temperature of the two catalysts is raised from ambient temperature (20° C.) to 150° C. under pure hydrogen. Then, the sulfurization feedstock that is treated only with DMDS (2.0% by weight) is injected at a flow rate of 160 cm$^3$/h. The temperature of the catalyst is then increased to 230° C. at the rate of 10° C./minute, and then there is a plateau until the amount of sulfur that is provided by DMDS corresponds to a $QS/QS_0$ value that is equal to 0.6. Contrary to the preceding example, no nitrogenous compound is added. The rise in temperature in this pilot-scale example is carried out at a much faster speed than for the embodiments on the industrial scale.

The temperature is then increased to 350° C. at the rate of 10° C./minute, and there is a plateau until the amount of sulfur that is provided by DMDS corresponds to a $QS/QS_0$ value that is equal to 1.2. A great difficulty in maintaining the temperature of the hydroconversion catalyst that indicates the existence of exothermal reaction has been observed. It is a cracking reaction since only 30% of the gas oil that is injected is recovered during the plateau at 350° C. Then, the temperature is lowered to the first test temperature, i.e., to 310° C. at which time the sulfurization feedstock is replaced by the feedstock that is to be treated, i.e., by the feedstock that is to be hydrocracked that is described in Table 3.

Example 3
(Anomalous)

The temperature of the two catalysts is raised from ambient temperature (20° C.) to 150° C. under pure hydrogen. Then, the sulfurization feedstock that is treated with DMDS (2.0% by weight) is injected at a flow rate of 160 cm$^3$/h. The temperature of the catalyst is then increased to 230° C. at the rate of 10° C./minute, then there is a plateau until the amount of sulfur that is provided by DMDS corresponds to a $QS/QS_0$ value that is equal to 0.2 (it was 0.6 times $QS/QS_0$ in Example 1). The rise in temperature in this pilot-scale example is carried out at a much faster speed than for the embodiments on the industrial scale.

The preceding sulfurization feedstock is then replaced by a second sulfurization feedstock that is treated with DMDS (2.0% by weight) and aniline (0.55% by weight). The temperature is then increased to 350° C. at the rate of 10° C./minute, and there is a plateau until the amount of sulfur that is provided by DMDS corresponds to a $QS/QS_0$ value that is equal to 1.2 times. During this entire sulfurization phase, the amount of gas oil that is recovered is close to 98% of that of the injected gas oil, which indicates that the sulfurization feedstock is not subjected to any significant cracking reaction. Then, the temperature is lowered to the first test temperature, i.e., to 310° C., at which time the sulfurization feedstock is replaced by the feedstock that is to be treated, i.e., by the feedstock that is to be hydrocracked that is described in table 3.

The catalytic performances are combined in Table 3.

TABLE 3

|  | Example 1 | Example 2 | Example 3 |
|---|---|---|---|
| T (70% of CB) | 363.5° C. | 392.2° C. | 369.4° C. |
| Cycle Duration (month) | 36 | 10 | 30 |

It is seen that the catalyst whose start-up has been carried out without adding nitrogen (Example 2) has very probably been very strongly coked since a difference of the temperature that makes it possible to reach a crude conversion level of 70% of close to 30° C. is observed between Example 2 and Example 1. The catalyst whose start-up has been carried out with nitrogen injection but with too small an amount of sulfur before 230° C. (Example 3) also has an activity that is lower than that of Example 1.

The stabilities of the catalysts of Examples 2 and 3 are also less favorable than that of the catalyst of Example 1; actually, the cycle duration of the catalyst of Example 1 is 36 months, whereas it is respectively 10 months for the catalyst of Example 2 and 30 months for the catalyst of Example 3.

The process according to the process of this invention makes it possible to obtain hydroconversion catalysts that have good catalytic performance levels, i.e., catalysts that have good activity and good stability. In addition, this process makes it possible to obtain catalysts that are not easily coked upon contact with the feedstock that is to be treated.

What is claimed is:

1. A process for activation of a hydroconversion catalyst containing at least one metal of group VIII and at least one acid element, said process comprising impregnating at least two light petroleum fractions distilled at a temperature less than 400° C., into said catalyst, at least one fraction being devoid of a nitrogen-containing compound and containing a sulfur-containing compound, and at least one fraction containing a nitrogen containing compound and a sulfur-containing compound, with the provision that a sulfur amount (QS) is impregnated before the catalyst temperature reaches 250° C. and is at least equal to half a sulfur amount $QS_0$ necessary for the complete sulfurization of the catalyst, and the fraction containing the nitrogen-containing compound is impregnated before the catalyst temperature reaches 270° C.

2. A process for activation according to claim 1, wherein the metal of group VIII is nickel or cobalt.

3. A process for activation according to claim 1, wherein the catalyst further contains at least one metal of group VI.

4. A process for activation according to claim 1, wherein the fraction containing the nitrogen-containing compound is impregnated in the catalyst before the temperature of said catalyst reaches 230° C.

5. A process for activation according to claim 1, wherein the sulfur-containing compound is selected from the group consisting of hydrogen sulfide, precursors of hydrogen sulfide and mixtures thereof.

6. A process for activation according to claim 5, wherein the hydrogen sulfide precursor is selected from the group consisting of dimethyl disulfide (DMDS), polysulfides, organic polysulfides (TPS), mercaptans, sulfides and disulfides, oxidized sulfur compounds and elemental sulfur.

7. A process for activation according to claim 1, wherein the nitrogen-containing compound is selected from the group consisting of ammonia, primary, secondary and tertiary amines, compounds containing a quaternary ammonium, arylamines of the aniline family, pyrroles and derivatives thereof, pyridines, nitrites, ureas and thioureas.

8. A process for activation according to claim 1 conducted in situ, in a zone where a feedstock that is to be treated will then be subjected to a reaction that is carried out in the presence of the activated catalyst.

9. A process according to claim 1, wherein at least one of said light petroleum fractions contains 95% of a feedstock distilled at a temperature less than 400° C.

* * * * *